US007719957B2

(12) United States Patent
Raahemi et al.

(10) Patent No.: US 7,719,957 B2
(45) Date of Patent: May 18, 2010

(54) RESILIENCY IN MINIMUM COST TREE-BASED VPLS ARCHITECTURE

(75) Inventors: Bijan Raahemi, Ottawa (CA); Bashar Said Bou-Diab, Ottawa (CA); Fernando Cuervo, Ottawa (CA)

(73) Assignee: Alcatel Lucent, Paris (FR)

( * ) Notice: Subject to any disclaimer, the term of this patent is extended or adjusted under 35 U.S.C. 154(b) by 712 days.

(21) Appl. No.: 11/212,661

(22) Filed: Aug. 29, 2005

(65) Prior Publication Data

US 2007/0047556 A1 Mar. 1, 2007

(51) Int. Cl.
*G01R 31/08* (2006.01)
*H04L 12/28* (2006.01)

(52) U.S. Cl. ............ 370/217; 370/256; 370/395.53; 370/408

(58) Field of Classification Search .............. None
See application file for complete search history.

(56) References Cited

U.S. PATENT DOCUMENTS

| | | | |
|---|---|---|---|
| 6,154,463 A * | 11/2000 | Aggarwal et al. | 370/408 |
| 2003/0016624 A1 * | 1/2003 | Bare | 370/217 |
| 2003/0026268 A1 * | 2/2003 | Navas | 370/400 |
| 2004/0174884 A1 | 9/2004 | Wright | |
| 2004/0174887 A1 * | 9/2004 | Lee | 370/395.53 |
| 2004/0233859 A1 * | 11/2004 | Martin | 370/254 |
| 2005/0108071 A1 * | 5/2005 | Jain et al. | 705/7 |
| 2005/0111386 A1 * | 5/2005 | Jain et al. | 370/256 |
| 2005/0226247 A1 * | 10/2005 | Brown | 370/395.2 |
| 2006/0098586 A1 * | 5/2006 | Farrell et al. | 370/254 |
| 2006/0245436 A1 * | 11/2006 | Sajassi | 370/395.53 |
| 2006/0268742 A1 * | 11/2006 | Chu et al. | 370/254 |

OTHER PUBLICATIONS

Srinivasan, Manikantan, Designing for Multicast Ooperation with IGMP: A Tutorial, Nov. 11, 2004, Net-O2 Technologies.*
(Alcatel), Delivery of Broadcast TV over a VPLS-Based Multicast Solution, pp. 1-13, XP001237249.
Itai, A., et al., The Multi-Tree Approach to Reliability in Distributed Networks.
Kodialam, M., et al., Dynamic Routing of Bandwith Guaranteed Multicasts with Failure Backup, IEEE, 2002.
Medard, M., et al., Redundant Trees for Preplanned Recovery in Arbitrary Vertex-Redundant or Edge-Redundant Graphs, IEEE/ACM Transactions on Networking, 7(5): 641-52.

(Continued)

*Primary Examiner*—Huy D Vu
*Assistant Examiner*—Brandon Renner
(74) *Attorney, Agent, or Firm*—Kramer & Amado P.C.

(57) ABSTRACT

A system for providing resilient multimedia broadcasting services over a VPLS network is described. A Network Management System (NMS) calculates disjoint minimum cost trees using the Steiner algorithm, executed with extra steps to result in disjoint trees. Destination PE routers in the VPLS network are connected to the disjoint trees so that they can be serviced by either tree in case of a fault. Each of the disjoint trees is provisioned with enough bandwidth to carry all of the services provided by the VPLS network. Under normal operation, however, the services are distributed evenly over the trees. In the event of a fault, the services on a faulty tree are switched to another tree using split horizon bridging. Each Steiner tree can also be realized using point-to-multipoint LSPs which is fully protected by a precomputed point-to-multipoint LSP.

12 Claims, 3 Drawing Sheets

OTHER PUBLICATIONS

Wang, Y., et al., Self-Healing on ATM Multicast Tree, IEICE Trans. Commun. E81-B(8): 1590-8.

Itai, A., et al., The Multi-Tree Approach to Reliability in Distributed Networks, 1984.

Kodialam, M., et al., Dynamic Routing of Bandwith Guaranteed Multicasts with Failure Backup, IEEE, 2002.

Medard, M., et al., Redundant Trees for Preplanned Recovery in Arbitrary Vertex-Redundant or Edge-Redundant Graphs, IEEE/ACM Transactions on Networking, 7(5): 641-52, 1999.

Wang, Y., et al., Self-Healing on ATM Multicast Tree, IEICE Trans. Commun. E81-B(8): 1590-8, 2004.

(Alcatel), Delivery of Broadcast TV over a VPLS-Based Multicast Solution, pp. 1-13, XP001237249, 2004.

* cited by examiner

Figure 3(A) Shortest Path Tree

Figure 3(B) Steiner Tree

RESILIENCY IN MINIMUM COST TREE-BASED VPLS ARCHITECTURE

FIELD OF THE INVENTION

This invention relates to broadcasting multimedia services over a VPLS network and more particularly to a Steiner Tree-based architecture for providing minimum cost and resiliency in a VPLS network.

BACKGROUND

Virtual Private LAN Services (VPLS), although a relatively new technology, is already being used by service providers to aggregate services for delivery to residential and enterprise customers. These services include broadcast multimedia such as Digital TV and Video on Demand.

VPLS, also known as Transparent LAN Service (TLS) or E-LAN service, is a layer 2 multipoint Virtual Private Network (VPN) that allows multiple sites to be connected in a single bridged domain over a provider managed IP/MPLS network. All customer sites in VPLS instance appear to be on the same LAN regardless of their location.

A VPLS-capable network consists of Customer Edges (CE), Provider Edges (PE) and a core MPLS network. The CE device is a router or switch located at the customer's premises and can either be owned by the customer or the service provider. It is connected to the PE via an Attachment Circuit (AC). The PE device is where all the VPN intelligence resides, where the VPLS originates and terminates and where all the necessary tunnels are set up to connect to all other PEs. The core MPLS network interconnects the PEs; it does not really participate in the VPN functionality. Traffic is simply switched based on the MPLS labels.

The basis of VPLS is the full mesh of MPLS tunnels (outer tunnels) that are set up between all the participating PEs in the VPN service. For every VPLS instance, a full mesh of inner tunnels also called pseudo wires (PW), is created between all the PEs that participate in the VPLS instance. A PW consists of a pair of point to point, single hop, unidirectional Label Switched Paths (LSP) in opposite directions, each identified by a PW label.

To prevent forward loops, the Split Horizon rule is used. In the VPLS context, this rule basically implies that a PE must never send a packet on a PW if that packet has been received from a PW. This ensures that traffic cannot form a loop over the backbone network using PWs. The fact that there is always a full mesh of PWs between the PE devices ensures that every destination within the VPLS will be reached by a broadcast packet.

Any new or emerging technology must be capable of providing as good as or better service than the technology it seeks to replace. Thus, for VPLS technology to find acceptance in the multimedia broadcast field it must be able to provide reliable and resilient service at a comparable cost to existing services. As a consequence there has been considerable effort devoted to finding architectures which allow VPLS to provide the required services in a cost effective and efficient manner.

The following discussion relates to efforts involving redundant trees which have evolved to support resiliency in a multicast network. These schemes can be classified into two categories: the static scheme which uses a pre-computed back up path, and a dynamic scheme that computes the back up path on the fly.

The algorithms in the static schemes build a primary and a backup tree at the same time. In a publication by M. Kodialem and T. Lakshman, "Dynamic routing of bandwidth guaranteed multicasts with failure backup", *Proceedings of IEEE INFOCOM*, June 2002, an algorithm is described that minimizes the bandwidth that is used by the primary and the backup paths. The algorithm selects every member of the group, starting with the source (in the case of shortest path trees) or center (in the case of center-based trees). For each member, two disjoint paths from the source (or center) to this member are computed. One path is inserted in the primary tree and the other in the backup tree. Bandwidth used by the trees is minimized. However, since a backup path protects the tree for all possible link failures, the total bandwidth that should be reserved for the backup tree is at least the same as the bandwidth reserved for the primary tree. Similar approaches are proposed by Alon Itai and Michael Rodeh, in "The multi-tree approach to reliability in distributed networks", *IEEE Symposium on Foundations of Computer Science*, pages 137-147, 1984 and by M. Médard, S. Finn, R. Barry, and R. Gallager, in "Redundant trees for preplanned recovery in arbitrary vertex-redundant or edge-redundant graphs", *IEEE/ACM Transactions on Networking*, 7(5):641-652, 1999 where the transmission from source to destination node is accomplished by sending the packet from source to the root node, and then from root to the destination node. If there is no link or node failure, the transmission is performed on the primary tree. When a single node or link failure happens, the traffic affected by the failure uses the backup tree. In the Médard et al publication, the algorithm constructs two directed Spanning trees rooted at source node. One of them is used as the working tree, and the other spanning tree is used for failure recovery.

In an article by Y. F. Wang and R.-F. Chan, entitled "Self-healing on ATM multicast tree", *IEICE Transaction on Communication*, E81-B(8):590-598, August 1998, an online (dynamic) mechanism is introduced to repair ATM multicast routing tree. When a failure happens, the multicast routing tree is split into two smaller trees. One of these smaller trees contains the source or center of the original tree and the other sub-tree is the tree rooted at the switch downstream of the failed link. That switch sends a failure notification message that contains its unique switch identifier to all of its neighbors. Each neighbor forwards the notification message to its own neighbors and so on, thus flooding the network with the notification message. The first switch of the other sub-tree that receives the notification message replies and a backup path is set up between the two switches. This backup path is inserted in the multicast routing tree, and the tree is repaired.

The pre-planned recovery schemes presented in prior arts focus on either "spanning tree" redundancy, or "shortest path tree" redundancy.

In related U.S. patent application Ser. No. 11/060,465 filed Feb. 18, 2005 a minimum cost tree architecture is proposed in order to broadcast multimedia services (Digital TV, Video on Demand) over VPLS networks. Although the tree structure in the prior application provides significant bandwidth savings compared to the traditional VPLS architecture based on full/partial mesh connectivity between PE routers, the tree structure is not resilient, i.e. a failure in the tree could disconnect many nodes, and even disrupt the whole communications. The contents of U.S. application Ser. No. 11/060,465 are incorporated herein by reference.

None of prior art, of which the inventors are aware, provides redundancy for minimum-cost (Steiner) multicast tree, which is the subject of this invention. Moreover, none of them discusses the steps as to how to switch over traffic from a failed tree to a backup tree.

SUMMARY OF THE INVENTION

The limitations of the prior art are overcome by the present invention which proposes a scheme for implementing Split Horizon (a characteristic of VPLS-enabled edge routers) together with dual connectivity at the receiver PE's to facilitate the switch-over process. In addition, in the specific application of this invention, that is broadcasting digital multimedia over VPLS, load balancing on the two trees (the working tree and the backup tree) is provided during the normal operation. Since both trees are static, it is both efficient and easy to distribute the channels on the two trees evenly. The load balanced redundant minimum-cost (Steiner) tree realized by the means of dual connectivity and split horizon at the PE's is the unique architecture proposed by this invention. Each Steiner tree can also be realized using point-to-multipoint LSP.

In this invention, a method and architecture are provided to protect the minimum cost (Steiner) tree-based VPLS from the failure of the Branching node in particular, and many other possible types of failures in general, thus providing a resilient architecture to broadcast multimedia services in a reliable manner.

Therefore, in accordance with a first aspect of the present invention there is provided a method of providing broadcast services over a VPLS network having at least two source PE routers, each of which is connected to a respective head-end system for broadcasting services, and having a plurality of destination PE routers, each of which is connected to at least two core provider (P) routers in the VPLS network, the method comprising the steps: calculating a plurality of Steiner trees, each such tree being sourced by a respective source PE router and including each destination PE router, the plurality of Steiner trees being disjoint from one another with respect to at least the core P routers in the VPLS network; provisioning each of the Steiner trees with enough bandwidth to carry all of the broadcast services; and broadcasting a portion of the broadcast services over each of the Steiner trees, whereby all of the broadcast services are broadcasted over the plurality of Steiner trees.

In accordance with a second aspect of the invention there is provided a Network Management System (NMS) for providing broadcast services over a VPLS network having at least two source PE routers, each of which is connected to a respective head-end system for broadcasting services, and having a plurality of destination PE routers, each of which is connected to at least two core provider (P) routers in the VPLS network, the NMS: means for calculating a plurality of Steiner trees, each such tree being sourced by a respective source PE router and including each destination PE router, the plurality of Steiner trees being disjoint from one another with respect to at least the core P routers in the VPLS network; means for provisioning each of the Steiner trees with enough bandwidth to carry all of the broadcast services; and means for broadcasting a portion of the broadcast services over each of the Steiner trees, whereby all of the broadcast services are broadcast over the plurality of Steiner trees.

In preferred embodiments of these aspects of the invention provisioning each of the Steiner trees is realized using point-to-multipont LSPs.

BRIEF DESCRIPTION OF THE DRAWINGS

The invention will now be described in greater detail with reference to the attached drawings wherein.

DETAILED DESCRIPTION OF THE INVENTION

Figure 1:
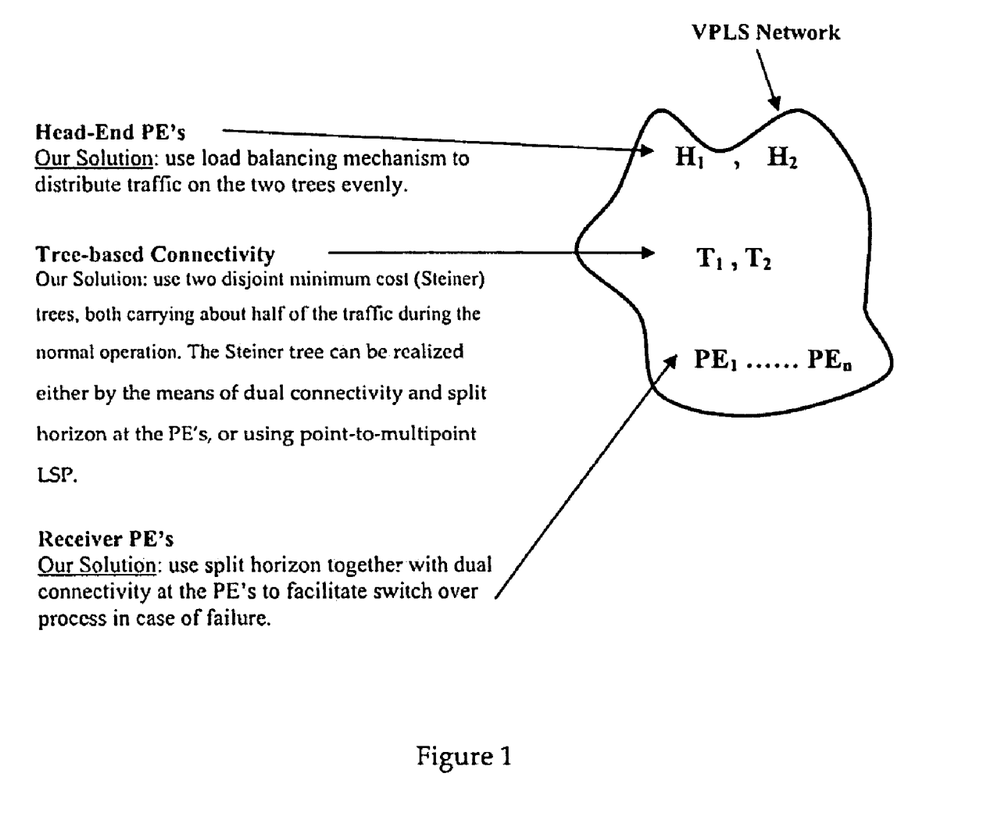
FIG. 1 is an abstraction of a digital multimedia broadcast system built upon a VPLS network.

FIG. 1 shows an abstract of a digital multimedia broadcast system built upon a VPLS network where H1 and H2 are special PE's connected to the Head-End and its backup, and PE1 . . . PEn are the PE's connected to the aggregation nodes (CE's) at the receiver site. In the traditional VPLS architecture, the connectivity between (H1, H2) and (PE1, . . . , PEn) is achieved by a mesh of Pseudo Wires. In the earlier application, Ser. No. 11/060,465, however, the inventors disclose a tree structure to carry traffic from the Head-End PE's to the receiver PE's. The tree could be a shortest path tree, or a minimum-cost tree also called Steiner tree which will be described herein in greater detail. Since the connectivity between PE's is achieved by the tree structure, we call the architecture of FIG. 1 the Tree-based VPLS, or TVPLS in short.

The present invention relates more specifically to a method and architecture for protecting the minimum cost (Steiner) TVPLS from the failure of a Branching node in particular, and many other failures in general.

Figure 2:
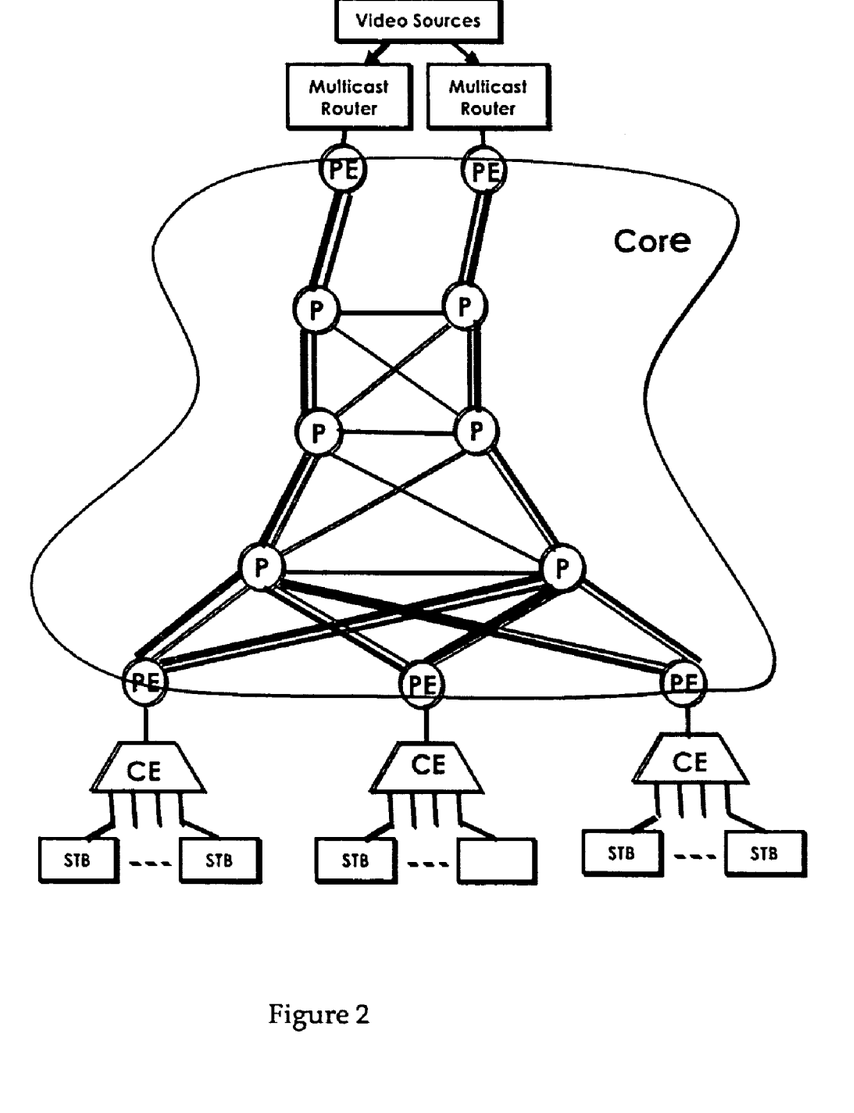
FIG. 2 illustrates a disjoint Steiner tree with dual homing at respective PEs.

The concept of the present invention is best illustrated with an example. FIG. 2 shows an example of a Steiner Tree-based VPLS network used for Digital TV broadcast services. The network is comprised of a video source attached to a multicast router, the Provider Edge (PE) routers, the core routers (P), the Customer Equipment (CE) or aggregation devices, and the Set-top Boxes (STB) that are attached to customer TV sets.

The core is fully or partially meshed. The connectivity between the receiver PE's and the transmitter PE's is provided by the VPLS network. However, instead of using a mesh of Pseudo Wires between PE's, a minimum-cost (Steiner) tree structure, similar to that described in the earlier application, is provided. The tree structure provides significant bandwidth savings compared to the traditional VPLS architecture (based on full/partial mesh connectivity between PE routers). However, the tree structure is not resilient, i.e. a failure in the tree could disconnect many nodes downstream from the source, and even disrupt the whole multimedia communications.

Figure 3A:
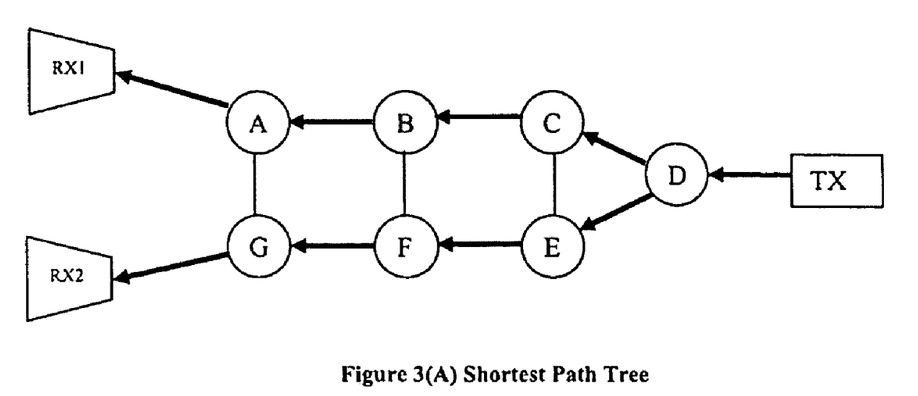
FIG. 3A illustrates a shortest path tree.
Figure 3B:
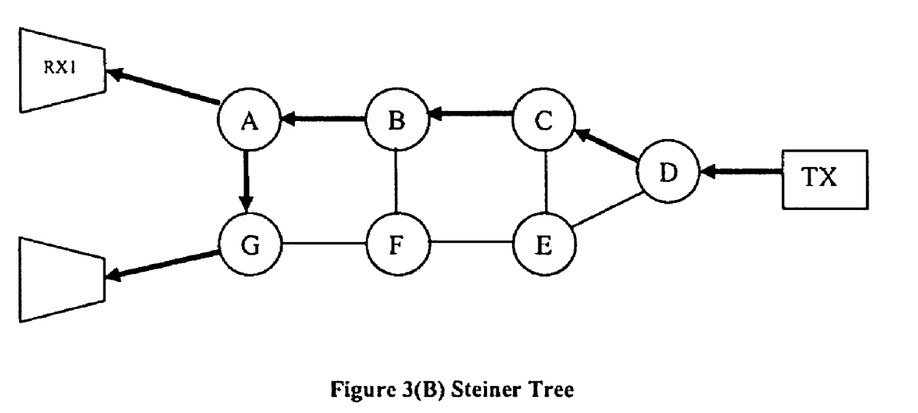
FIG. 3B shows a Steiner tree according to the present invention.

The Steiner tree problem is described as a combinatorial optimization problem. In its most general setting it is stated in a way similar to that of the minimum spanning tree problem, i.e. given a set V of points (vertices), it is required to interconnect them by a network (graph) of shortest length provided that it is allowed to add new vertices to the network (graph). The Steiner Tree is also described as a minimum cost tree which interconnects a subset of nodes in a graph. Its cost is less than the shortest path tree built in a MPLS network. FIG. 3($a$) shows a Shortest Path tree where 6 links are utilized in the Provider Networks, whereas the same connectivity can be provided by only 4 links if a Steiner tree is used as shown in FIG. 3(b).

Formally, the Steiner problem in graphs is stated as follows: Given a graph G=(V,E), where V is the set of Vertices and E is the set of Edges on the graph, and given a cost function associated with Edges, and given a source vertex S, and a set of destination vertices D, find a subtree T=(VT, ET) of G which spans S and D (connects vertex S to vertices in D) such that the cost of the tree T cost(T) is minimized.

The Steiner tree problem is shown to be NP complete (no solution in polynomial time). However, there are a number of heuristics available which provide sub-optimal solutions to the Steiner tree problem in polynomial time. Since calculation of Steiner tree is an optimization problem, iterative solutions ranging from Ant Colony Approach to Genetic Algorithm, and Simulated Annealing, as well as non-iterative solutions such as minimum Spanning Tree are proposed to provide sub-optimal solution. The accuracy of iterative solutions depends on the number of iterations.

All of these solutions provide an answer which are sub-optimal, and in the worst case, the cost of the tree is twice of the optimal cost. One of the best heuristic is based on minimum spanning tree algorithm, where first a complete graph G'=(D, E') is constructed based on the length of the shortest path between S and D's in G.

a minimum spanning tree T' is constructed for G'.

the edges in T' is converted to paths in G to form the Steiner solution.

More formally, a well-known heuristics algorithm to compute Steiner tree is presented by B. Waxman, in "Routing of Multipoint Connections", IEEE Journal of Selected Areas in Communications, Vol. 6, No. 9, Dec. 1988, pp. 1617-1622. The heuristic algorithm is known as the KMB algorithm (named after the original inventors of the algorithm Kou, L., G. Markowsky, L. Berman—"A Fast Algorithm for Steiner Trees", Acta Informatica, Springer-Verlag, vol. 15, no. 2, 1988, pp. 141-145.7]).

In summary the algorithm is as follows:

Inputs:

(a) An undirected distance graph G=(V,E,d), where V is the set of vertices, E the set of edges, and d is the set of edge cost, (b) a set of Steiner Points S subset of V. (note: Terminals of a subset of S)

Output: a Steiner Tree T for G and S

Step 1: Construct a complete undirected distance graph G*= (S, E*, d*) from G and S. Here E*={{v1,v2}: v1 and v2 distinct elements of S} and for every {v1,v2} element of E*, d*({v1,v2}) is set equal the distance of the shortest path from v1 to v2 in G.

Step 2: Find a minimal spanning tree T* of G*.

Step 3: Construct the subgraph G' of G by replacing each edge in T* by a corresponding shortest path in G.

Step 4: Find a minimal spanning tree T' of G'.

Step 5: Construct a Steiner tree, T from T' by deleting edges in T', if necessary, so that all the leaves in T are Steiner points.

The algorithm has a worst case time complexity of $O(|S||V|^2)$.

There could be different points of failure in the network shown in FIG. 2, such as Non-Branching 'P' Routers, Branching 'P' Routers, Source 'PE' Routers, Destination 'PE' Routers, Source Multicast Routers, Customer Edge Equipment (CE), Links in the core, Links between CE and PE (Attachment Circuits). The CE and PE devices are built with redundancy. The control plane is redundant. The data-path (hardware & software) might also be redundant. The failure of the link between the CE and PE, called Attachment Circuits (AC), is recovered by redundancy typically provided by the IEEE 802.3AD Link Aggregation protocol. The failure in the core can be recovered using MPLS Fast Re-Route. Also, the core is fully or partially meshed. The 'P' routers are built with high degree of reliability and redundancy. As such, failure of core routers must be considered as a rare event.

There are several mechanisms available to detect node or link failures. For instance, a general scheme such as "Bi-directional Forwarding Detection" can be used to detect both link and node failures. Link failure can also be detected at layer 1 by the medium (example: loss of light, loss of signal, SONET/SDH alarms, etc.). Failure detection is out of scope of this invention, and it is assumed that a mechanism is already in place to detect failures.

In the present invention Load Balanced Disjoint Steiner Trees with Split Horizon and Dual connectivity at the PEs are provided. These are provided by methods and architecture to protect the minimum cost (Steiner) tree-based VPLS from the failure of the Branching node in particular, and many other possible types of failures in general, thus providing a resilient architecture for broadcasting multimedia services. In the following description the details as how to switch over traffic from failed tree to backup tree are provided. There is also a description of the process for implementing Split Horizon together with dual connectivity at the receiver PE's to facilitate the switch over process. In addition, in the specific application of this invention, that is broadcasting digital multimedia over VPLS, load balancing on the two trees (the working tree and the backup tree) during the normal operation is discussed. Since both trees are static, it is both efficient and easy to distribute the channels on the two trees evenly.

The Branching P (BP) router is a core router which is also capable of terminating an MPLS LSP, and performing either a VLAN broadcast or an MPLS multicast. These routers are also built with high degree of reliability and redundancy. As such, their failures are a rare event. However, if a BP router fails, many nodes are affected. To recover from such failure, one option would be to assume that the upstream P router is capable of branching, and then, employ a signaling mechanism to transfer the branching function from the failed BP router to its upstream P router. This option introduces complexity, and assumes that basically many P routers in the network are capable of branching. An alternate solution is provided herein based on computing a disjoint minimum-cost (Steiner) tree together with employing split horizon at the PE's as shown in FIG. 2.

The Network Management System (NMS) pre-computes two disjoint Steiner trees taking advantage of dual connectivity at the receiver PE's. This is achieved by computing the first Steiner Tree and then, removing the P nodes of the first tree from the list of the Graph, and computing a second Steiner tree without involving the P routers of the first tree in the computations. Note that only the P routers are excluded in the computation of the second tree (not the Branching P routers). With this scheme, two disjoint minimum-cost (Steiner) trees are computed by the Network Management System, and provisioned through the network. It is worth noting that since the cost of the Steiner tree is, in average, about 60% of the cost of the shortest path tree as computed by the Dijkstra algorithm and used by the PIM (see V. Kompella, J. Pasquale, G. Polyzos, "Multicast Routing for Multimedia Communications", IEEE/ACM Transactions on networking, Vol. 1, NO.

3, June 1993, pp. 286-292.5), the total cost of our solution including two Steiner trees is about 20% more than (and still comparable to) the cost of the shortest path tree while providing full redundancy. In a normal operation, a load balancing mechanism is employed at the Head-End PE's to distribute TV channels on both trees evenly. Although each tree has enough capacity to carry all the channels from the source PE to the destination PE's, they are only utilized for about half of the bandwidth. The other half is carried over the other tree. If a failure happens on one tree, its traffic is switched over to the other tree per the recovery steps described below.

During the service initialization stage the Network Management System (NMS) pre-computes 2 disjoint Steiner Trees as shown in FIG. 2. The LSPs are assigned, and the bandwidths are reserved on both trees such that each tree can carry all the channels. However, the trees are not fully utilized. A load balancing mechanism is employed in Head-End PE's to distribute channels on both trees evenly. As such, in a normal operation, each tree is utilized by about half of the multimedia traffic.

At the failure of a branching 'P' router on one of the trees, the NMS inserts Static IGMP memberships at the working multicast router to broadcast all TV channels on the working tree. To attach receiver CE's to the working tree, split horizon rules are used at the receiver PE's. If PE's are capable of doing Split Horizon, no additional action is required. The traffic flow on the backup tree will automatically be forwarded to the Attachment Circuits.

After the channels are broadcast on the working tree, the NMS stops forwarding channels on the failed tree by removing the Static IGMP entries in the primary multicast router. This frees up the bandwidth available on the failed tree.

In the proposed architecture of FIG. 2, it is to be note that a. The architecture should be such that it is physically possible to recover from a failure, i.e. the core architecture is meshed (or partially meshed). The PE's have dual connectivity.

b. Recoveries from the link failures are performed by MPLS fast re-route, RPR Protection Switching or an equivalent path recovery method.

c. Redundancy of "Source Multicast Router" should be provided, although the present solution can also be implemented by only one multicast router.

An important application of the VPLS is in broadcasting multimedia services. In such applications, the resiliency of the architecture is highly desirable. This invention provides resiliency in tree-based VPLS which are not provided by any prior art known to the inventors.

Generally, the prior art focus on either spanning tree redundancy or shortest path tree redundancy. None of it provides redundancy for minimum-cost (Steiner) multicast tree. Moreover, none of it discusses the steps as to how to switch over traffic from failed tree to backup tree. The combination of Steiner tree, with split horizon and dual connectivity at the PE's results in a unique architecture presented in this invention which supports resiliency in tree-based VPLS broadcast systems.

Also, a pre-planned recovery scheme, as proposed herein, outperforms dynamic failure recovery such in speed. Dynamic failure recovery is usually slow and does not provide an equate restoration time of less than 50 mSec.

Although specific embodiments of the invention have been described and illustrated, it will be apparent to one skilled in the art that numerous changes can be introduced with departing from the basic concepts. It is to be understood, however, that such changes will fall within the full scope of the invention as defined by the appended claims.

We claim:

1. A method of providing broadcast services over a Virtual Private LAN Services (VPLS) network having at least two source Provider Edge (PE) routers, each of which is connected to a respective head-end system for broadcasting services, and having a plurality of destination PE routers, each of which is connected to at least two core provider (P) routers in the VPLS network, the method comprising:
    calculating a plurality of Steiner trees, each Steiner tree in the plurality of Steiner trees being sourced by a respective source PE router and including each destination PE router from the plurality of destination PE routers, the plurality of Steiner trees being disjoint from one another with respect to at least the core P routers in the VPLS network, said calculating comprising:
        computing a first Steiner tree coupled to a first multicast router and having a set of the core P routers,
        computing a second Steiner tree coupled to a second multicast router without involving the set of the core P routers of the first Steiner tree in the computations, and
        provisioning both the first Steiner tree and the second Steiner tree with enough bandwidth to carry all of the broadcast services but using load balancing so that the first Steiner tree has about half of the bandwidth and the second Steiner tree has about half of the bandwidth;
    broadcasting the broadcast services evenly over the first Steiner tree and the second Steiner tree, whereby all of the broadcast services are broadcasted over the first Steiner tree and the second Steiner tree; and
    after the first Steiner tree fails, switching all of the bandwidth to the second Steiner tree, wherein the switching step comprises:
        inserting static Internet Group Management Protocol (IGMP) memberships in the second multicast router, and
        removing IGMP entries from the first multicast router.

2. The method of claim 1, further comprising:
    calculating the first Steiner tree and the second Steiner tree using point-to-multipoint Label Switched Paths (LSPs).

3. The method of claim 1, further comprising:
    detecting a fault in the first Steiner tree to designate a faulty tree and a non-faulty tree, and, in response to detecting the fault; and
    attaching, according to a split-horizon bridging, Customer Edge (CE) routers of the faulty tree to the non-faulty tree.

4. The method of claim 3, further comprising:
    freeing bandwidth on the faulty tree.

5. The method of claim 1, wherein the broadcast services are digital multimedia services.

6. The method of claim 5, wherein the digital multimedia services are digital television services.

7. The method of claim 5, wherein the digital multimedia services are video on demand services.

8. The method of claim 1, further comprising:
    using a Network Management system (NMS) to provide the broadcast services.

9. The method of claim 8, further comprising:
    using the NMS to pre-compute the first Steiner tree and the second Steiner tree such that bandwidth is reserved for the first Steiner tree and the second Steiner tree.

10. A Network Management System (NMS) that provides broadcast services over a Virtual Private LAN Services (VPLS) network having at least two source Provider Edge (PE) routers, each of which is connected to a respective head-end system for broadcasting services, and having a plurality of destination PE routers, each of which is connected to at least two core provider (P) routers in the VPLS network, the NMS comprising:

means for calculating a plurality of Steiner trees, each Steiner tree in the plurality of Steiner trees being sourced by a respective source PE router and including each destination PE router from the plurality of destination PE routers, the plurality of Steiner trees being disjoint from one another with respect to at least the core P routers in the VPLS network, wherein said calculating further comprises:

computing a first Steiner tree coupled to a first multicast router and having a set of the core P routers, computing a second Steiner tree led to a second multicast router without involving the set of the core P routers of the first Steiner tree in the computations, and provisioning both the first Steiner tree and the second Steiner tree with enough bandwidth to carry all of the broadcast services but using load balancing so that the first Steiner tree has about half of the bandwidth and the second Steiner tree has about half of the bandwidth;

means for broadcasting the broadcast services evenly over the first Steiner tree and the second Steiner tree, whereby all of the broadcast services are broadcasted over the first Steiner tree and the second Steiner tree; and means for, after the first Steiner tree fails, switching all of the bandwidth to the second Steiner tree, wherein the means for switching comprises:

means for inserting static Internet Group Management Protocol (IGMP) memberships in the second multicast router, and means for removing IGMP entries from the first multicast router.

11. The NMS of claim 10, wherein the provisioning for both the first Steiner tree and the second Steiner tree uses point-to-multipoint Label Switched Paths (LSPs).

12. The NMS of claim 10, wherein split horizon bridging is used to distribute services.

* * * * *

UNITED STATES PATENT AND TRADEMARK OFFICE
CERTIFICATE OF CORRECTION

PATENT NO.        : 7,719,957 B2
APPLICATION NO.   : 11/212661
DATED             : May 18, 2010
INVENTOR(S)       : Bijan Raahemi, Bashar Said Bou-Diab and Fernando Cuervo It is certified that error appears in the above-identified patent and that said Letters Patent is hereby corrected as shown below:

Claim 10, Column 9, line 17, change "led" to "coupled"

Signed and Sealed this

Twenty-second Day of June, 2010

David J. Kappos
*Director of the United States Patent and Trademark Office*